Figure 1:
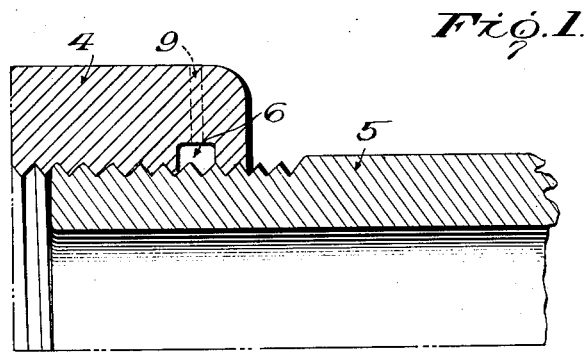

Feb. 13, 1934.  E. C. FURMAN ET AL  1,946,619
METHOD OF SEALING LEAKS IN THREADED JOINTS
Filed May 12, 1933

Inventors
Eugene C. Furman
Edmund F. Heard.
By Cameron, Kerkam & Sutton
Attorneys Patented Feb. 13, 1934

1,946,619

UNITED STATES PATENT OFFICE 1,946,619

METHOD OF SEALING LEAKS IN THREADED JOINTS

Eugene C. Furman, Newport News, and Edmund F. Heard, Hampton, Va.

Application May 12, 1933. Serial No. 670,778

3 Claims. (Cl. 285—159)

This invention relates to a method including process and apparatus, for sealing leaks in threaded joints, and particularly to such a method and apparatus which may be used while the joint is in service, and without changing the pressure on the joint or the position of its parts, although if preferred the present invention may be utilized when the line is not in service.

It has heretofore been proposed to provide a threaded joint with a groove in the threaded portion of one of the threaded members, and with a passage extending from said groove to the exterior of said member, said passage being tapped at its outer end and provided with a threaded plug for normally closing said passage. With such a construction the threaded plug may be removed and a suitable sealing material may be forced under pressure through the passage and into said groove, from which it will be distributed between the threaded members to form a seal therebetween. Not only is the provision of said passage with its tapped outer end and threaded plug a substantial addition to the cost of the fitting, which becomes an unnecessary cost in a large percentage of threaded joints because the majority in service do not leak, but such a construction also possesses a number of other disadvantages, among the more important of which may be noted the fact that the presence of the passage with its threaded plug constitutes an additional opportunity for leakage to occur, so that considerable difficulty has been experienced in rendering the threaded plug fluid-tight without rendering said plug unremovable in the event that a need for injection of sealing material arises, and the fact that the threaded plug may be in an inaccessible position when the threaded joint is finally set up, because of contiguous walls, pipes, or other members interfering with a convenient access thereto, so that before the plug can be removed and sealing medium injected, the pressure has to be taken off of the line or container and another joint disconnected so that the outer part of the leaking joint can be rotated to render the plug accessible, all of which is time consuming and expensive. Obviously if a plurality of such tapped holes and threaded plugs are provided so that access may certainly be gained thereto from some convenient point when the threaded joint is finally set up, the fitting is materially weakened, more opportunities for leakage exist, and the initial cost of construction is materially increased while, as the majority of threaded joints do not leak in service, this constitutes an additional cost which in the majority of joints becomes unnecessary. At the same time, all joints must be similarly constructed because of the impossibility of foretelling which joint will become leaky in the course of time.

It is an object of this invention to provide a method and apparatus for sealing threaded joints which can be used with all threaded joints with a minimum addition to the initial cost of the fitting, and which at the same time avoids the difficulties heretofore experienced with the constructions above referred to.

Another object of this invention is to provide a method and apparatus of the type characterized which eliminates the difficulties heretofore experienced in rendering fluid-tight the means provided for enabling a ready sealing of the leak when it occurs.

Another object of this invention is to provide a method and apparatus of the type characterized which enables the joint to be sealed from any conveniently accessible point irrespective of how the members of the threaded joint are initially set up.

Another object of this invention is to provide a method and apparatus of the type characterized which minimizes the danger that the inner of the two members which constitute the joint will be injured by the procedure pursued in sealing the joint.

Another object of this invention is to provide a method and apparatus of the type characterized which can be used without especial skill, to the end that said method and apparatus may be employed by ordinary plumbers, pipe fitters and the like without danger of injury to the line, system or members in which the joint is disposed.

Another object of this invention is to provide a method and apparatus of the type characterized which is simple, inexpensive, effective and efficient for the purposes specified. Other objects will appear as the description of the invention proceeds.

Stated broadly, the present invention involves the provision in one or the other of the two members constituting the threaded joint, and preferably between the middle of the threaded section and the end of the member, of a recess or recesses in the form of a groove or a plurality of groove sections, together with suitable information whereby the position of said groove or groove sections may be readily located from the exterior of the joint, whereby, when a leak occurs in the joint, a hole may be drilled through the exterior member at a convenient location with respect to contiguous members but in such a position as to intersect said groove or a groove section, the entry of the drill into said groove or groove section, together with the escape of fluid which would normally accumulate therein, affording information to the operator that the outer member has been punctured, to the end that the drilling operation may be stopped before the inner of the two threaded members is injured.

The provision of the grooves or groove sections in one of the two threaded members constituting the joint is a simple and inexpensive operation which adds little to the initial cost of the joint, while the expense heretofore entailed in providing the passage to the exterior of the outer member, the tapping of said passage, and the provision of a threaded plug in said tapped opening, is saved for all those joints which do not become leaky. Said groove or groove sections may be provided by merely removing the ridge of the thread for a greater or less extent of the circumference of the threaded surface, or if preferred, the groove or groove sections may be cut somewhat into the body of the member so as to increase the size of the recess or recesses thus provided. Said groove or groove sections are preferably provided in the outer member for reasons that will appear hereinafter, but if preferred said groove or groove sections may be provided in the inner member, particularly if in the form of a complete circumferential groove so located that its position can be certainly determined from the exterior of the joint.

As the joint as initially installed has no hole leading from said groove or groove sections to the exterior of the joint, there is no additional point at which leakage may occur, and therefore the difficulties heretofore experienced in rendering the threaded plug at the end of the tapped passage fluid-tight are entirely avoided. At the same time, inasmuch as the hole is drilled into the groove or a groove section only in the event that a leak arises, said hole may be drilled where it is most convenient to gain access to the joint, particularly when the recess takes the form of a groove that extends throughout the circumference of the threaded surface, although when groove sections are employed, they will be sufficiently numerous or extend over a sufficient extent of the circumference of the threaded member so as to assure that there will be at least one point at which ready access may be gained to the joint for drilling the hole irrespective of how the threaded members may be set up in initially installing the joint.

Figure 2:
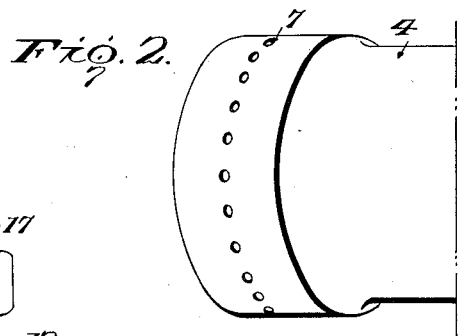
Figure 3:
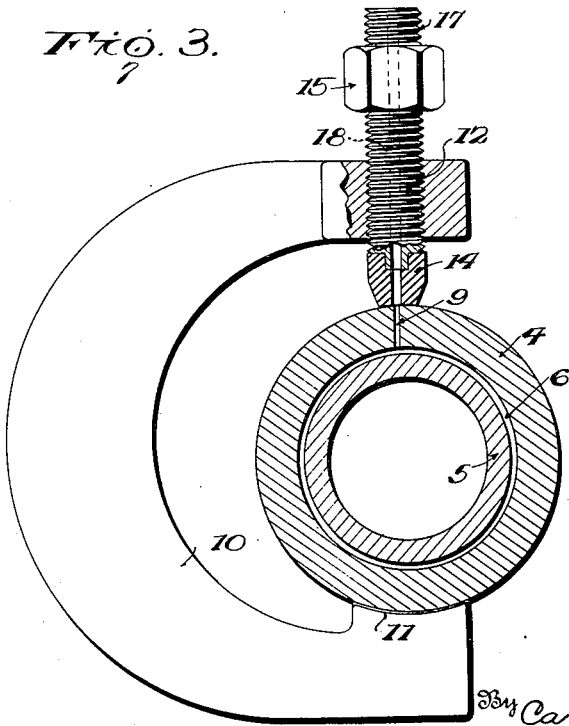

The invention can be carried out in a variety of ways as will hereinafter appear, the accompanying drawing being selected only for purposes of illustration, to afford a more ready understanding of the invention. In said drawing wherein the same reference characters indicate corresponding parts in the several figures, Fig. 1 is a schematic axial section through a fragment of a threaded joint to illustrate the application of the invention;

Fig. 2 is a perspective view of the outer threaded member to illustrate one of the various means which may be employed to designate the location of the groove or groove sections within the threaded member; and Fig. 3 is a transverse section of a threaded joint illustrating a suitable apparatus in position for injecting any suitable sealing medium into said joint.

Referring to the drawing more in detail, a threaded joint is schematically illustrated in Fig. 1 as composed of an outer member 4 and an inner member 5 suitably threaded to provide a joint of any suitable character and construction, such as found in pipe couplings, unions, T's, L's, crosses, valves, flanges, joints between pipes and containers of various characters, etc., as used in systems, lines, containers, etc., for conveying or retaining various liquids, gases, etc. In conformity with the present invention one of said members is provided in the threaded portion thereof with a groove or one or more groove sections forming one or a plurality of recesses 6. Said recess or recesses may be provided in the inner member 5 provided the location thereof is definitely fixed, as at a predetermined distance from some mark or position on said member, so that its location in the completed joint can be determined from the exterior of the joint. By preference, however, said recess or recesses are provided in the outer member 4, because of the greater facility with which the same can be definitely located with respect to the end of the member 4 or with respect to some indication appearing upon the exterior of said member 4. The recess 6 need not extend circumferentially for any greater length than is necessary to provide with certainty that a hole can be drilled from the exterior of said member to intersect therewith, but the simplest and most economical manner of affording the aforesaid certainty is to provide the recess in the form of a groove which extends throughout the circumference of said threaded member. However, it is to be expressly understood that the groove may extend for less than the circumference of said member, or a plurality of separated though preferably circumferentially aligned recesses may be formed, provided that the extent of the single groove or the number and distribution of the separated recesses are such as to assure that in whatever position the threaded member shall be set up, a drilled hole may be made to intersect therewith at a position which is conveniently accessible from the exterior of said joint. Whether a single groove or a plurality of separated recesses are provided, they may be formed by merely removing the top or ridge portion of the thread, or they may be cut more deeply into the body of the member so as to provide a somewhat deeper recess or recesses for a purpose to be explained.

In order that the location of said groove or groove sections may be readily determined after the joint is installed and without disconnecting said members, they may be located at a standardized distance from the end of the threaded member, which standardized distance may vary for pipes of different sizes, and which standardized distance or distances may be suitably marked on the exterior of the member or the information may be conveyed by tags, printed matter, or in any other suitable way, or the location thereof can be determined by suitable jigs or templets or scales furnished for the purpose, or the member 4 may be provided with suitable visible indicia to show the location of said groove or groove sections. In Fig. 2 the exterior member 4 is shown as provided with a plurality of bosses or projections constituting an interrupted ring around the member 4 in radial alignment with the groove 6 therein, but if preferred, said projections may be united into a continuous rib or ring, or a groove or a series of depressions may be employed in place of a rib or series of bosses. If the interior spaces take the form of spaced recesses or less than a circumferential groove, the exterior indicating means, whether projections or depressions, should be in radial alignment with said interior space or spaces and be coextensive therewith in a circumferential direction, so as to definitely locate the position and extent of said recesses.

Upon the occurrence of a leak in the joint, a hole 9 is drilled through the exterior member at a convenient location with respect to the recess 6, until said hole intersects said recess. When the drill breaks through into said recess 6, there will be a distinct jar as well as a distinct change in the resistance to movement of the drill, so that the operator will be definitely advised that the outer member has been punctured, and will not continue his drilling operation so as to injure or puncture the inner member. Particularly when a threaded joint has been in service for a considerable period of time, corrosion and attrition may have reduced the wall of the inner threaded member until it is very thin. In the absence of some definite means for indicating to the operator that the exterior threaded member has been punctured, he is likely to continue his drilling operation until the inner member is injured or punctured, thereby opening a hole from the inner member to the exterior of the outer member which will be very difficult, if possible, to seal. The present invention, however, assures that the operator will be advised of the instant when the tool breaks through the outer threaded member into the recess, so that the drilling operation will be discontinued.

Moreover, the fluid that is passing through the pipe will normally collect in the recess 6, and when the tool breaks through into said recess, said fluid will escape through the hole thus formed and by its escape afford an additional indication to the operator that the exterior threaded member has been punctured. If the character or pressure of the fluid in the pipe is such that the escape thereof from the recess 6 when the hole 9 has been drilled thereinto is not sufficient to indicate to the operator the fact that the fluid is escaping, the surface of the member can be provided with a soapy or oily solution so that the escaping fluid will form bubbles and thereby afford a visual indication of the fact that the recess 6 has been reached.

The hole 9 having been drilled as aforesaid, a suitable sealing material may be injected into the threaded joint by means of any suitable device adapted to force the sealing medium into the recess and distribute it therefrom under a sufficient pressure to cause it to flow between the threaded surfaces of the members 4 and 5 and form a permanent fluid-tight seal therefor. By preference the sealing medium employed is one that hardens under the influence of the temperature or character of the fluid flowing through the joint. Where the pipe conveys steam or a medium that can be heated, the sealing medium may be of a character which becomes vulcanized by heat, as for example disclosed in Furman Patent No. 1,620,154, granted March 8, 1927. If preferred, however, the material may be one that crystallizes or hardens by chemical change or it may be of any other suitable character for forming a permanent seal between the threaded surfaces.

The means for injecting the sealing medium into the drilled hole 9 may be of any suitable construction. Preferably means are employed which may be tightly clamped to the pipe or joint member and which will form a sealing contact therewith so as to prevent escape of sealing medium between the injecting device and the exterior surface of the joint member. While any suitable clamping device may be employed, a preferred construction is shown in Fig. 3 wherein a U-shaped clamping member 10 is provided with a seat 11 adapted to engage the periphery of the joint member and to be forced into tight clamping engagement therewith when the nozzle of the gun is screwed up. It is to be understood, however, that any other suitable form of clamping means may be used if preferred. As shown, the gun includes a threaded stem 12 provided with a nozzle which has a tip 14 formed of some readily deformable material, such as lead, copper, leather, rubber, or the like. Said stem 12 is provided with a portion 15 which may be gripped by a wrench so as to thread said stem into the clamp 10 until its nozzle tightly grips the periphery of the joint member 4 over the drilled hole 9 and the tip of the nozzle deforms around said hole in gripping fluid-tight contact therewith. If preferred, however, the end of the nozzle may have a hardened cutting nipple that will cut into the material of the member 4 and form a fluid-tight joint therewith. The stem 12 may be provided interiorly with a chamber and have therein a pressure producing means as disclosed in the aforesaid Furman Patent No. 1,620,154, or, as illustrated, said stem may have a threaded nipple 17 for connection with any suitable injecting or pressure developing device, said stem being shown as provided with a passage 18 extending therethrough and through which the sealing medium may be forced under pressure into the drilled hole 9.

The sealing medium forced from the gun through the drilled hole 9 into the recess 6 will be distributed by the latter and flow therefrom between the surfaces of the threaded joint, it being understood that the sealing medium is to be injected under sufficient pressure to not only overcome the pressure existing within the joint, but to force the sealing medium between said threaded surfaces so as to completely fill all interstices therebetween and completely seal the joint against further leakage of fluid therefrom. When the sealing medium has become set in the joint, by vulcanization, crystallization, chemical action, or otherwise, the clamp and gun may be removed, and as the sealing medium has hardened in the drilled hole 9, the escape of fluid therethrough is prevented. If preferred, however, the outer end of the hole may be additionally closed by peaning over the metal, or by driving or threading into the open end of the hole a plug or stopper of any suitable character.

It will therefore be perceived that by the present invention, means have been provided whereby a leaking threaded joint may be effectively and efficiently sealed without dismantling the joint and by a procedure that is so simple that it can be carried out by unskilled plumbers, pipe fitters, and the like. As the only initial provision in the joint is the groove or recesses heretofore described, the initial cost of a threaded member to enable the present invention to be carried out is insignificant. At the same time, the provision of a hole from the interior of the threaded member is required in only those joints which actually become leaky and only after the leak has arisen, so that the expense of providing such a hole is avoided as to all those joints which do not spring a leak, while the difficulty heretofore experienced in preventing leakage through such a hole originally formed in the joint is wholly avoided. As the present invention provides that the hole may be drilled at any convenient location around the circumference of the threaded member, the difficulties heretofore experienced in gaining convenient access to a preformed passage are entirely eliminated. The present invention also assures that the operator will be certainly advised when the drilling tool passes through the exterior threaded member, both by reason of the sensation which will exist when the drilling tool reaches the recess and by reason of the escape of fluid from said recess through the drilled hole, whether or not the latter is visibly indicated by the formation of bubbles in a soapy or oily solution, and hence the danger that the drilling will puncture the inner threaded member and injure the apparatus by producing a leak of a magnitude that cannot be readily corrected is entirely avoided. Hence a simple, inexpensive, effective and efficient method and apparatus have been provided whereby leaks in threaded joints may be readily corrected while the joint is in service and without moving its parts or changing the pressure thereon.

While the illustrated apparatus has been described with considerable particularity, it is to be expressly understood that the invention is not restricted thereto. As will now be apparent to those skilled in the art, the groove or recesses, the means for indicating where the groove or recesses are located within the threaded member, the means for injecting the sealing medium into the joint, etc., may take a variety of forms. Reference is therefore to be had to the appended claims, wherein the term recess is used as generic to a circumferential groove and one or more groove sections of less than circumferential length, for a definition of the limits of the invention.

What is claimed is:

1. Method for sealing leaks in threaded pipe joints which includes providing a recess in the threaded portion of the outer member of the joint, providing an opening from the surface of said member to said recess when a leak occurs, introducing into said recess through said opening a sealing material under greater pressure than the pressure existing in the interior of the joint, and retaining the pressure on said material until it hardens in said recess.

2. Method for sealing leaks in threaded pipe joints which includes providing a recess in the threaded portion of one of the members of the joint at a location determinable from the exterior of the joint, providing an opening from the surface of said member to said recess when a leak occurs, introducing into said recess through said opening a sealing material under greater pressure than the pressure existing in the interior of the joint, and retaining the pressure on said material until it hardens in said recess.

3. Method for sealing leaks in threaded pipe joints which includes providing a circumferential groove in the threaded portion of the outer member of the joint at a predetermined distance from the end thereof, providing an opening from the exterior of said member to said groove when a leak occurs, introducing into groove through said opening a sealing material under greater pressure than the pressure existing interiorly of the joint whereby said material will fill said groove and flow into the interthread spaces, and retaining the pressure on said material until it hardens.

EUGENE C. FURMAN.
EDMUND F. HEARD.